United States Patent [19]

Fukui

[11] 4,313,129
[45] Jan. 26, 1982

[54] VIDEO SIGNAL TIME BASE ERROR CORRECTION CIRCUIT

[75] Inventor: Tutomu Fukui, Tokorozawa, Japan

[73] Assignee: Universal Pioneer Corporation, Tokyo, Japan

[21] Appl. No.: 87,181

[22] Filed: Oct. 22, 1979

[30] Foreign Application Priority Data

Oct. 26, 1978 [JP] Japan .................. 53-131979

[51] Int. Cl.³ .............................. H04N 5/76
[52] U.S. Cl. .................... 358/8; 358/128.6; 360/36; 360/38
[58] Field of Search ............... 358/127, 128.5, 128.6, 358/4, 8, 129-132, 19; 360/33, 36, 38, 37

[56] References Cited

U.S. PATENT DOCUMENTS

| | | | |
|---|---|---|---|
| 3,578,902 | 5/1971 | Monsay | 358/8 |
| 3,580,991 | 5/1971 | Krause | 358/8 |
| 3,921,202 | 11/1975 | Dann et al. | 358/8 |
| 4,150,395 | 4/1979 | Pritchard | 358/8 |
| 4,220,968 | 9/1980 | Scholz | 360/36 |

Primary Examiner—Raymond F. Cardillo, Jr.
Attorney, Agent, or Firm—Sughrue, Mion, Zinn, Macpeak & Seas

[57] ABSTRACT

A system for compensating and correcting errors in the time base of video signals read from a video disc in which the errors are corrected first coarsely in response to phase differences between horizontal sync signals of the video signals following which a fine correction is made in response to measured phase differences of burst signals of the video signal. A first phase detector produces an output signal in response to phase differences between the burst signals and an output of a reference frequency generator operating at the burst frequency. A second phase detector produces an output signal in response to phase differences between the horizontal signals and the reference signal divided down by a predetermined factor. The output signals of the two phase detectors are summed and then applied to the control input of a variable delay line which adjusts the delay time and hence phase errors in the video signal accordingly.

4 Claims, 1 Drawing Figure

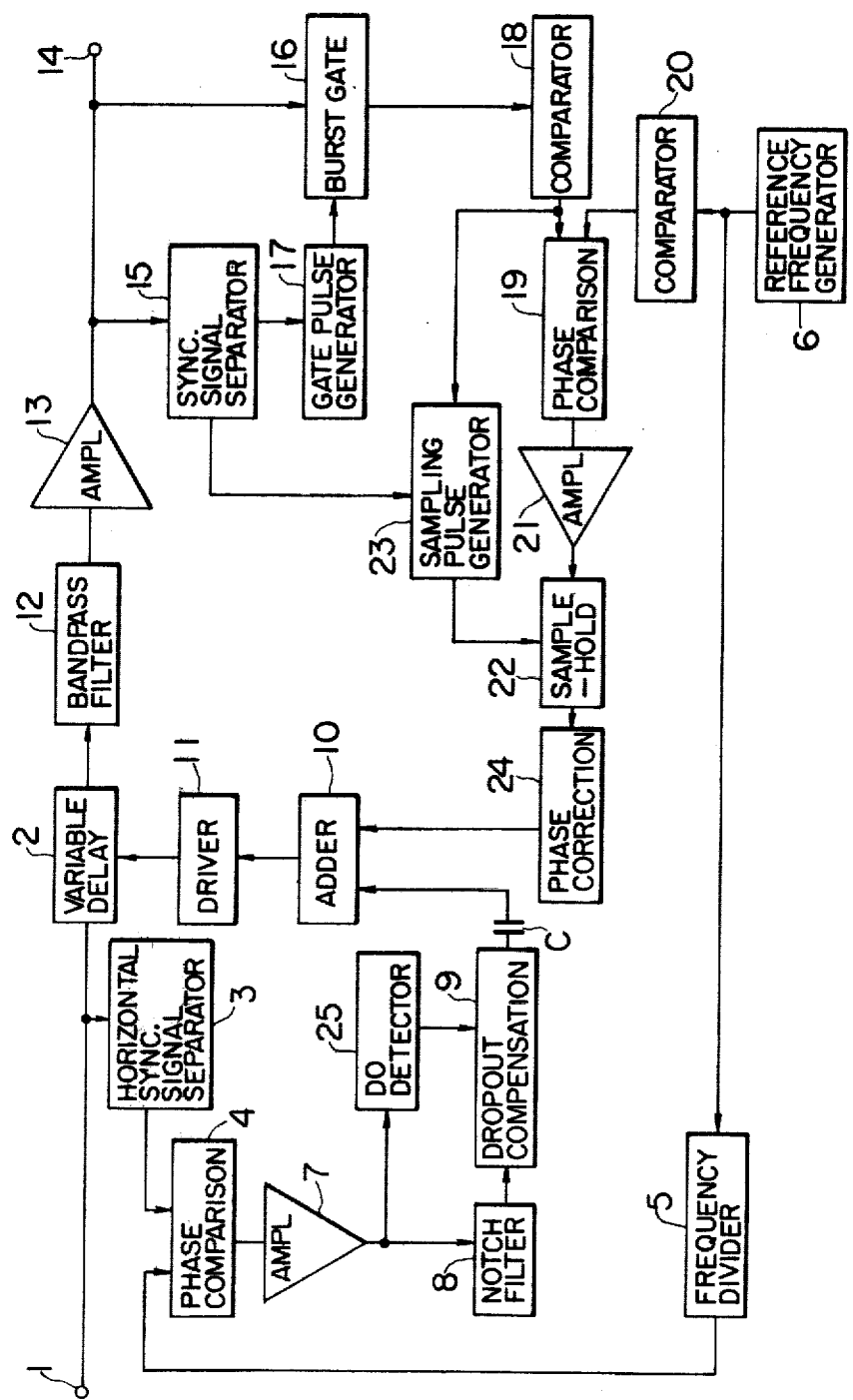

VIDEO SIGNAL TIME BASE ERROR CORRECTION CIRCUIT

BACKGROUND OF THE INVENTION

The present invention relates to a time base error correction system for video signals reproduced from a rotary recording carrier such as a video disc.

In the reproduction of video signals recorded on a rotary recording carrier such as video disc, it is known that eccentricity of the rotary recording carrier or wow and flutter of the rotational mechanism may cause time base errors in the reproduced video signals resulting in interrefence in the reproduced video pictures. Particularly, when the video signals include color information, the acceptable limit for errors of frequency and phase in the sub-carrier is quite small and hence such time base errors must be reduced as much as possible.

A dominant frequency component of the time base error due to eccentricity of the rotary recording carrier is usually 30 Hz. One solution according to the prior art is to extract this 30 Hz component by means of bandpass filters from error signals obtained by phase comparison of the burst signal and to utilize the error signals in an independent closed-loop system so as to correct the time base errors. One disadvantage of this method is the design complexity of the bandpass filter which must have a very high Q (selectivity factor) so that the 30 Hz closed loop system will not interfere with the main control system. Another disadvantage is that if the time base error is larger, it takes quite a long time to lock in because of the time constant of the filter as well as the inherent nature of the closed-loop system. In the worst case, it may not lock at all. Further, in the case of CLV disc operated with a constant line velocity, since the dominant frequency component may shift downward with time from 30 Hz, the center frequency of the bandpass filter must be varied in accordance with the lapsed time. This gives rise to great difficulties in designing such a tracking filter and such a system may be unstable with respect to temperature changes. Furthermore, the conventional system can correct the time base errors to the extent of 15 microseconds at the most.

It is, therefore, the primary object of the present invention to provide a circuit arrangement for correcting time base errors in video signals which avoids the disadvantages of the prior art and extends the upper limit of the possible range of time base correction.

SUMMARY OF THE INVENTION

The invention does not require a 30 Hz closed-loop system as was necessary with the prior art yet provides a novel arrangement for time base correction of video signals in which error signals are derived in response to phase differences between the horizontal sync signals of the video signals and reference signals, and the error signals are added to other error signals obtained from the burst signals in a main loop so as to correct time base errors.

In accordance with a preferred embodiment of the invention, there is provided a system for video signal time base error correction including video signal reproducing means for sensing and delivering video signals from a rotating recording carrier, a reference frequency generator circuit, a first phase detector circuit for producing output signals in response to phase differences between burst signals of the video signals and an output of the reference frequency generator circuit, variable delay line means having a signal input receiving the video signals for correcting time base errors of the video signals, a second phase detector circuit for producing output signals in response to phase differences between horizontal sync signals of the video signals, a reference signal produced by dividing the output of the reference frequency generator circuit by a predetermined factor and an adder circuit for summing the output signals of the first and second phase detector circuits with an output of the adder circuit representing the sum of the output signals being coupled to a control input of the variable delay line means. The control input of the variable delay line means is utilized to determine the delay time imparted to signals applied to the signal input thereof before they arrive at the output terminal.

In a preferred embodiment, the variable delay line means is a CCD delay line. In this case, a voltage-controlled oscillator is provided between the output of the adder circuit and the control input of the variable delay line means. Further, there may be provided a sample-and-hold circuit having a signal input coupled to receive the output signal of the first phase detector with the output signal thereof coupled to an input of the adder circuit and with a control input of the sample-and-hold circuit coupled to a source of gating pulses produced when the first signals are present.

Still further, there may be provided a drop-out detecting circuit means for detecting drop out in the output of the second phase detector circuit. The drop-out detecting circuit means during periods of drop out produces an output signal for bridging over the missing video signal. To this effect, a drop-out compensating circuit means is coupled to the output of the drop-out detecting circuit for correcting variations in the output of the second phase detector circuit. The output of the drop-out compensating circuit is capacitively coupled to the corresponding input of the adder circuit.

BRIEF DESCRIPTION OF THE DRAWINGS

The present invention will be described with reference to the accompanying drawing. The sole FIGURE illustrates a block diagram of a time base error correction circuit in accordance with the present invention.

DESCRIPTION OF THE PREFERRED EMBODIMENTS

At the input terminal 1 of the system shown in the diagram of the FIGURE there are supplied video signals derived from a rotary recording carrier (not shown in the drawing) such as a video disc or the like. The video signals are composite video signals including color information, which may be composed according to, for instance, the NTSC system, and from which video pictures can be reproduced by a reproducing apparatus such as a standard TV receiver without any additional processing of the signals other than that which is usually required.

When the video signals are sensed and reproduced while the rotary recording carrier is rotating, the video signals obtained usually include time base errors due to eccentricities in the recording carrier or turntable, variations of the speed of rotation of the recording carrier during the recording operation, mechanical distortion of the recording carrier, or wow or flutter in the driving motor of the turntable and the like. When the video signals including such time base errors are reproduced on the TV screen, flicker or substantial visible errors in the hue of the color may result in the reproduced picture.

In accordance with the present invention, such time base errors are corrected in the following manner. The video signals applied to the input terminal 1 are fed both to a variable delay unit 2, which may be implemented by a variable delay device such as CCD, and a sync separator circuit 3. The horizontal sync signals separated by the sync separator 3 are supplied to one input terminal of a phase detector circuit 4 to the other input terminal of which are supplied output signals from a frequency divider circuit 5 which supplies reference horizontal sync signals. The frequency divider circuit 5 produces its output signals by dividing down the output of a reference frequency generator circuit 6 which generates frequency signals of 3.58 MHz. The phase detector circuit 4 compares the phase between the horizontal sync signals and the reference horizontal sync signals to produce error signals indicative of phase difference. The error signals are coupled to a 15.75 KHz notch filter 8 via an amplifier 7. The notch filter 8 is provided to eliminate noise components which are synchronous with the horizontal sync signals, otherwise the variable delay unit 2 may be operated by pattern noise at 15.75 KHz thereby resulting in incorrect color shading in the reproduced pictures. The output signals from the notch filter 8 are fed to one of the input terminals of an adder circuit 10 through a drop-out compensating circuit 9 and a capacitor C which is provided to pass only the alternating current components of the signals so that no difference in the DC levels between the signals from the drop-out compensating circuit 9 and error signals derived from the burst signals is present at the adder circuit 10. The error signal forms another input to the adder circuit 10. The output of the adder circuit 10 is supplied to a driving circuit 11 for the variable delay unit 2. When a CCD is employed as the variable delay unit 2, the driving circuit 11 may be constructed of a voltage controlled oscillator (VCO) and a clock driver circuit so as to vary the amount of delay of the variable delay unit 2 in order to cancel the time base errors resulting in correction of time base errors in the video signal.

There has thus far been described an open-loop correction system utilizing horizontal sync signal comparison. Although this system is capable of functioning quite well in many applications, such an open-loop correction system has an inherent limitation in principle in that the accuracy of correction cannot be extended beyond the accuracy of the separated horizontal sync signals. Therefore, it may in some applications be desirable to provide a fine adjustment by means of a closed-loop system if it is desired that the accuracy of correction take into account the phase of the burst signals. The open-loop correction system is nevertheless still quite efficacious for correcting time base errors of larger amplitudes so that the time base errors may be compressed to be within the dynamic range of the closed-loop correction system which will next be described.

The output of the variable delay unit 2 is passed through a bandpass filter 12 to eliminate unnecessary frequency components and then amplified to a desirable level by an amplifier 13 the output of which is coupled both to a sync separator circuit 15 and a burst gate circuit 16 as well as to an output terminal 14. A gate pulse generator circuit 17 produces gate pulses in response to the sync signals separated by the sync separator circuit 15 producing gate pulses during the presence of burst signals. The gate pulses are fed to the burst gate circuit 16 which in turn extracts the color burst signals from the video signals. The extracted burst signals are converted to TTL levels by a comparator circuit 18 and then applied to one of the input terminals of a phase detector circuit 19, the other input terminal of which receives the output of reference frequency generator circuit 6, namely, the 3.58 MHz reference signal which has also been converted to TTl levels by a comparator circuit 20. The output error signals from the phase detector circuit 19 are supplied to an amplifier 21, which incorporates a 3.58 MHz notch filter, to be amplified to a desirable level. Then the output signals of the amplifier 21 are applied to a sample-and-hold circuit 22 in which the signals are held during the horizontal sync period. A sampling pulse generator circuit 23 is arranged so as to produce sampling pulses only when burst signals are present. The output signal from the sample-and-hold circuit 22 is supplied to a phase corrector circuit 24 which corrects phase errors introduced into the servo system. The phase corrected signals are applied to the other input terminal of the adder circuit 10.

Since the closed loop system is operated in dependence upon the phase of the burst signals, the accuracy of correction can reach the accuracy of the phase of the burst signals. Consequently, residual time base errors in the corrected video signals may be compressed sufficiently to reproduce video pictures without substantial interference when the video signals are reproduced by a standard color TV receiver.

In view of the foregoing discussion, it may be readily understood that time base errors in video signals may be corrected. However, when so called "drop-out" is present in the reproduced sync signals upon their separation by the horizontal sync separator circuit 3, sharp spike noises may occur as a result in the error signals produced by the phase comparison circuit thereby making the reproduced video pictures unstable and blurred. Hence it may be quite desirable from a practical view point to provide drop-out compensating means. Here "drop-out" means a state in which no signal is reproduced from the video disc such as may by due to dust and dirt on the disc which masks the video information. In the embodiment mentioned above, a drop-out detecting circuit 25 is provided to detect drop out by way of error signals derived from the phase comparison.

In response to the output of the drop-out detecting circuit 25, the drop-out compensating circuit 9 holds the previous signal during drop-out periods so that no interference appears in the reproduced video pictures.

In a video disc recording system in which regulation of the speed of the rotating spindle is accomplished by means of phase comparison of the horizontal sync signals, it is possible to eliminate the horizontal sync separator circuit 3, the phase detector circuit 4 and other related circuits by utilizing the error signals derived from a phase comparison of the horizontal sync signals in the spindle servo system as the error signals of the open-loop correction system.

In view of the foregoing discussion, it may be readily understood that this invention enables the extension of the correction range by utilizing a coarse regulating system for phase comparison of horizontal sync signals along with a fine regulating system operating with a phase comparison of burst signals. Experiments have provided that time base errors can be corrected to 30 microseconds in accordance with the invention. It is believed possible to correct larger time base errors by increasing the dynamic range of the variable delay line unit including a CCD or the open-loop error signals. It is also recognized that DC drift of the open-loop system does not adversely effect the closed-loop system since the error signals of the open-loop system are AC-coupled and drift of the open-loop system can be maintained within acceptable limits by employing a feedback amplifier so that stable operation over long time periods is made possible.

What is claimed is:

1. A system for the correction of time base errors in video signals reproduced from a rotating record carrier, said reproduced video signals including burst signals and horizontal sync signals, said system comprising:

time base error correction means, including a variable delay line means, for receiving said reproduced video signals and for correcting time base errors in said video signals in response to a control signal, the output of said delay line means comprising corrected video signals;

a reference frequency generator circuit for generating a reference frequency signal;

phase detection means, including a phase detector circuit having first and second inputs and providing an output in accordance with a phase difference between said first and second inputs, for receiving said corrected video signals and said reference frequency signal and producing output signals in response to phase differences between said burst signals and said reference frequency signal;

horizontal sync means for providing an output corresponding to said horizontal sync signals and said video signals;

dividing means for frequency dividing said reference frequency signal to provide a second reference frequency signal;

second phase comparison means, including a second phase detector having first and second inputs and providing an output in accordance with a phase difference between said first and second inputs, for receiving the outputs of said horizontal sync means and said dividing means and providing an output signal in response to a phase difference therebetween;

dropout detecting means for detecting a dropout in the output of said second phase detector due to a dropout of said horizontal sync signals, and for providing an output signal during the occurrence of a dropout;

dropout compensating circuit means for correcting, in accordance with the output of said dropout detecting circuit, variations in the output of said second phase comparison means due to dropout; and an adder circuit for summing the outputs of said first phase comparison means and said dropout compensating circuit means, an output of said adder circuit comprising said control signal to said time base error correction means.

2. The time base error correction system of claim 1 wherein said variable delay line means comprises a CCD delay line.

3. The time base error correction system of claim 2 wherein said CCD delay line includes a delay line control terminal and delays said video signals in accordance with a signal provided to said delay line terminal, said time base error correction means further comprising a voltage-controlled oscillator, said voltage controlled oscillator having a control input coupled to said output of said adder circuit and an output coupled to said control input of said CCD delay line.

4. The time base error correction system of claim 1, further comprising means for providing sampling pulses during said burst signals, and wherein said first phase comparison means includes a sample-and-hold circuit having a signal input coupled to receive said output signal of said first phase detector, a signal output coupled to an input of said adder circuit and a control input coupled to receive said sampling pulses.

* * * * *